United States Patent
Iselt

(10) Patent No.: US 6,917,582 B1
(45) Date of Patent: Jul. 12, 2005

(54) PROCESS FOR SYNCHRONIZING DATA STREAMS CONTAINING ATM-CELLS

(75) Inventor: Andreas Iselt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,298

(22) PCT Filed: Feb. 3, 1999

(86) PCT No.: PCT/DE99/00287

§ 371 (c)(1),
(2), (4) Date: Jul. 31, 2000

(87) PCT Pub. No.: WO99/40752

PCT Pub. Date: Aug. 12, 1999

(30) Foreign Application Priority Data

Feb. 4, 1998 (DE) .......................... 198 04 394

(51) Int. Cl.$^7$ .............................................. H04L 12/26
(52) U.S. Cl. ..................... 370/218; 370/395.1; 370/503
(58) Field of Search ........................ 370/394, 411–418, 370/395.1, 218, 216, 228, 244, 503, 516

(56) References Cited

U.S. PATENT DOCUMENTS 5,200,950 A * 4/1993 Foglar et al. ................ 370/219
5,285,441 A * 2/1994 Bansal et al. ................ 370/218
5,475,675 A * 12/1995 Kondo et al. ................ 370/219
5,677,931 A * 10/1997 Okuyama et al. ........... 375/260
5,751,695 A * 5/1998 Ohashi ....................... 370/218

OTHER PUBLICATIONS

Ohta, H. et al., "ATM Hitless Line Protection Switching Method for Forced Switch Commands", Electronics & Communications in Japan, Part I—Communications, vol. 79, No. 11, Nov. 1996, pp. 52–64; XP 000647052.

Yamaguchi, K. et al., "Transport Systems Based on Flexible, Non–Stop Architecture"; Proceedings of the Global Telecommunications Conference, (1993), pp. 1468–1475, XP000436060.

Ohta, H. et al., "Hitless Line Protection Switching Method for ATM Networks", Proceedings of the International Conference on Communications, (1993), pp. 272–276, XP000371105.

* cited by examiner

Primary Examiner—Chau Nguyen
Assistant Examiner—Soon D. Hyun
(74) Attorney, Agent, or Firm—Morrison & Foerster LLP

(57) ABSTRACT

In the Prior Art, redundant data streams comprising ATM cells are in turn merged in that an attempt is made to produce synchronism. This, however, lasts very long as a rule. The invention provides alleviation in that both data streams are written into buffer memories and the stored ATM cells are checked for equality. Transmission sequence numbers thus need not be provided.

3 Claims, 2 Drawing Sheets

US 6,917,582 B1

PROCESS FOR SYNCHRONIZING DATA STREAMS CONTAINING ATM-CELLS

BACKGROUND OF THE INVENTION

1. Field of the Invention

The invention is directed to a method for synchronizing data streams having a data stream comprising a plurality of data units in which a data stream is split into two congruent, redundantly fashioned data sub-streams.

2. Description of the Related Art

In order to be able to transmit information such as voice information or data via communication networks, the information to be transmitted are combined to form data units. In contemporary communication networks, these data units are fashioned in packets or cells such as ATM cells, but care must be taken to preserve the sequence of the data units in the transmission. When the sequence of the data units is not directly assured, for example by not using transmission sequence numbers, serious errors can occur in the communication of the data units. Further errors and losses can occur in that individual data units are either disturbed (modified content) or entirely missing (for example, due to buffer overflows in switching equipment).

In the Prior Art, the dependability of connections in communication networks is enhanced by redundant transmission via two physically separate paths, however, this scheme has problems in the synchronization of the redundant data streams at the receiver and the switching between the data streams.

The publication, Ohta, H., Ueda, E., "Hitless Line Protection Switching Method for ATM Networks", International Conference on Communications, Proceedings ICC '93, pp. 272–276, 1993, discloses a method with which the payload data transported in ATM cells are employed for synchronization.

This known method is specifically disclosed for ATM cells. It comprises a total of three operating conditions (search process, confirmation process, out-of-alignment process). In the "search process" condition, an ATM cell of an arbitrarily selected data stream is stored and compared to all following ATM cells of the other data stream. When two ATM cells agree with one another, then the measured delay is assumed as a running time difference between the signals. When no matching ATM cell for the intermediately stored ATM cell was capable of being found beyond a maximum length, then another ATM cell of the other data stream is intermediately stored and compared.

Since the content of different ATM cells need not necessarily be different, this assumption that identical ATM cells in the two data streams must correspond to one another is not always correct, and hence, the assumption is checked by multiple repetition, where an ATM cell is respectively stored and compared to the ATM cell of the other data stream that corresponds to the previously identified delay. Only then is the next ATM cell stored and compared. But this makes the method become very slow.

The "confirmation process" condition follows when the search process was successfully run. In this condition, a delay having the size of the measured running time difference is inserted into the leading data stream (that from which the ATM cell was respectively stored). Subsequently, the delayed ATM cells of the leading data stream are compared to the current ATM cells of the trailing data stream. When this comparison is also repeatedly correct, then the synchronism is considered detected and a switch into the "out-of-alignment detection process" condition ensues.

In the "out-of-alignment detection process", the delayed ATM cells of the leading data stream continue to be compared to the current ATM cells of the trailing data stream. When more than a predetermined plurality of comparisons are successively false, then a re-synchronization is triggered.

The prior art discloses the possibility of switching from one data stream to the other at any time requires that an ATM cell can only be forwarded when it was received from both data streams. This method, however, means that a delay amounting to the maximum of the two data streams is always inserted, and results in a very long duration until the synchronism of two data streams has been detected. Moreover, this method has no tolerance with respect to the lack of individual ATM cells, so that every omission of an ATM cell from a data stream triggers a new synchronization process.

SUMMARY OF THE INVENTION

The invention is based on the object of providing a method for assuring a dependable transmission of information in ATM cells without deteriorating the dynamics of the transmission event.

The invention is achieved by a method for synchronizing data streams having a data stream comprising a plurality of data units that correspond to ATM cells, comprising the steps of splitting the data stream into respectively two congruent, redundantly fashioned data sub-streams, merging the two data substreams, one of the two data sub-streams being defined as leading, merging the two data sub-streams, one of the two data sub-streams being defined as leading, writing each of the two data sub-streams into a respective buffer memory at a beginning of a search phase, comparing, during the search phase, data units of the two data sub-streams to one another over a specific length that corresponds to a multiple of an ATM cell, thereby producing synchronism between the two data sub-streams, further comparing, during a confirmation phase, the data units of the two data sub-streams over the specific length, thereby producing a detected synchronism, checking the identified synchronism to ensure that it is being maintained in a failure recognition phase.

What is especially advantageous about the invention is that the synchronism is very quickly recognized due to the buffering of the data streams. Moreover, a transmission that is resistant with respect to missing or faulty ATM cells is established by the introduction of a failure recognition phase in the form of an error-tolerant comparison.

Advantageous developments of the invention may be found where the above method further comprises the step of correcting an ATM cell recognized as faulty and/or missing during an error recognition procedure by replacing the faulty/missing ATM cell with a corresponding ATM cell taken from an intact, other the redundant sub-stream. A further advantageous development may also be found where the above method further comprises the step of supplying ATM cells optionally corrected based on criterion of the error recognition procedure to further devices.

BRIEF DESCRIPTION OF THE DRAWINGS

The invention is explained in greater detail below on the basis of the figures of an exemplary embodiment.

DESCRIPTION OF THE PREFERRED EMBODIMENTS

Figure 1:
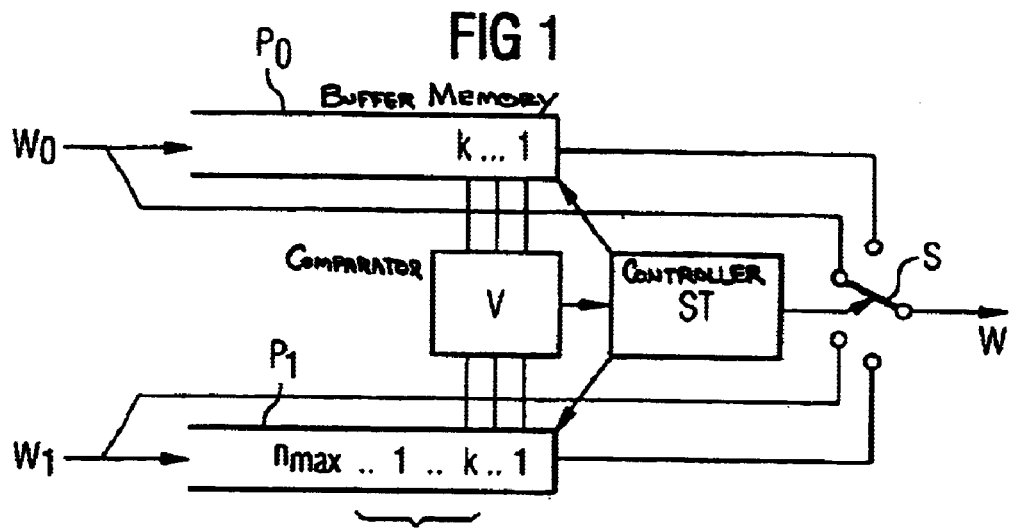
FIG. 1 is a block circuit diagram of a device on which the inventive method is run.

FIG. 1 shows a device on which the inventive method is run. An ATM cell stream is split into two redundant data streams that are routed via different paths $W_0$, $W_1$ separately and independently of one another. The data streams are turn merged in a device according to FIG. 1. Buffer memories $P_0$, $P_1$ into which the ATM cells of the data streams are written are provided for this purpose. The ATM cells of the data stream $D_0$ are written into the buffer memory $P_0$ and the ATM cells of the data stream $D_1$ are written into the buffer memory $P_1$. The ATM cells are compared to one another in a comparator V. These procedures are controlled and monitored by a controller ST. Based on the criterion of the inventive method, the ATM cells are taken from the buffer memories and supplied to further devices via a path W.

Figure 2:
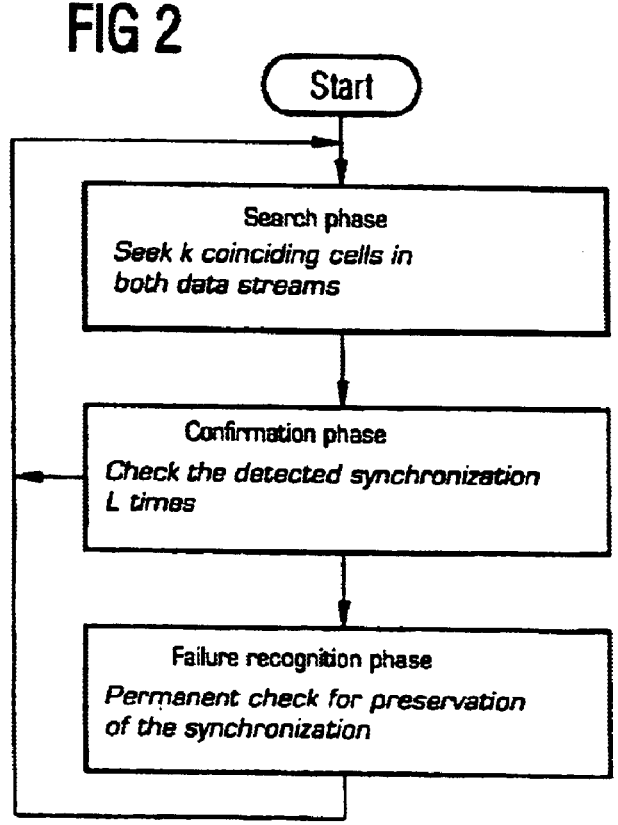
FIG. 2 is a flow chart showing individual stages of the inventive method.

As can be derived from FIG. 2, the method is basically composed of two stages, a synchronization process and a switchover process. The synchronization is implemented with the assistance of the transmitted payload data of the redundant data streams. The synchronization process is fashioned in three phases overall. In the first phase, a synchronization is sought (search phase). The synchronization is checked in the second phase (confirmation phase), and failures are recognized in the third phase (failure recognition phase).

The synchronization is started with the search phase. It is initially unknown which of the two data streams $D_0$, $D_1$ is to be considered leading. One data stream is therefore assumed to be leading, either arbitrarily or on the basis of other information not specified in greater detail here (for example, which data stream supplies an ATM cell first). The present exemplary embodiment assumes that the data stream $D_1$ is leading.

The ATM cells of the data stream $D_1$ assumed to be leading are then written into the buffer memory $P_1$. In the same way, the ATM cells of the data stream $D_0$ assumed to be trailing are written into the buffer memory $P_0$. Subsequently, the k oldest, delayed ATM cells of the data stream $D_1$ are compared to the k most current, most recently received ATM cells of the data stream $D_0$ assumed to be trailing, which are respectively compared upon arrival of an ATM cell of the data stream $D_0$ defined as trailing. The comparison operations are undertaken in the comparator V.

The ATM cells of the data stream $D_1$ assumed to be leading are quasi "retained", while the ATM cells of the data stream $D_0$ defined as trailing "run" past and are always compared over a length of k ATM cells. Let the current filling level of the buffer memory $P_1$ be defined as l, where l>k applies.

When the assumption that has been made concerning the property of a data stream as being leading is correct, then coincidence will always prevail when comparing the ATM cells when the filling of the buffer memory $P_1$ (the data stream assumed to be leading) corresponds to the running time difference l−k of the data streams.

When the data stream assumed to be trailing is only received after an ATM cell that is newer than the oldest stored ATM cell of the leading data stream, then the comparison valves can never agree. A maximum value $n_{max}$ is therefore provided for the buffer length of the leading data stream.

When the buffer memory $P_1$ of the data stream $D_1$ assumed to be leading has been filled to this maximum mark $n_{max}$ without a coinciding region of k ATM cells having been found in the two data streams, then the original assumption is modified and the other data stream $D_0$ is assumed to be leading. The ATM cells belonging to this data stream continue to be written into the buffer memory $P_0$ until a comparison over k ATM cells is correct or the buffer memory $P_0$ is likewise filled. In the latter instance, this is emptied and the original assumption is again modified. This procedure thus corresponds to an alternating sampling.

Alternatively, a simultaneous sampling can be provided. To this end, the search phase is simultaneously implemented for both assumptions. However, more buffer memory must be provided for the simultaneous sampling. A shortening of the time required until recognition of the synchronization is achieved by this approach compared to the alternating sampling.

It is generally true that the probability for an incorrect assumption of the synchronization is all the higher the shorter the comparison length k is. The assumption L that has been made is therefore verified L times in the confirmation phase following the search phase in that respectively newly arriving ATM cells of the two data streams $D_0$, $D_1$ are compared to one another in pairs. A longer confirmation phase (greater L) again means greater security against missynchronization. Beginning with the confirmation phase and during the following failure recognition phase, the respectively oldest ATM cell of the leading data stream is deleted from the buffer memory given a correct pair-by-pair comparison.

A switch into the failure recognition phase occurs when the confirmation phase was also run error-free. Otherwise, the method begins anew with the search phase. In the failure recognition phase, the ATM cells of the two data streams $D_0$, $D_1$ continue to be compared in pairs. When they no longer agree, the reason for disagreement can be that an ATM cell is affected by an error or that individual ATM cells of a data stream are missing. When, in contrast, one data stream fails entirely, then ATM cells of this data stream are no longer received.

Upon recognition of an error in the pair-by-pair comparison of ATM cells during the failure recognition phase, comparisons are implemented with the ATM cells that were received preceding and following the compared ATM cells in order to identify the type of malfinction. Possible error types are pre-defined for this purpose.

Figure 3A:
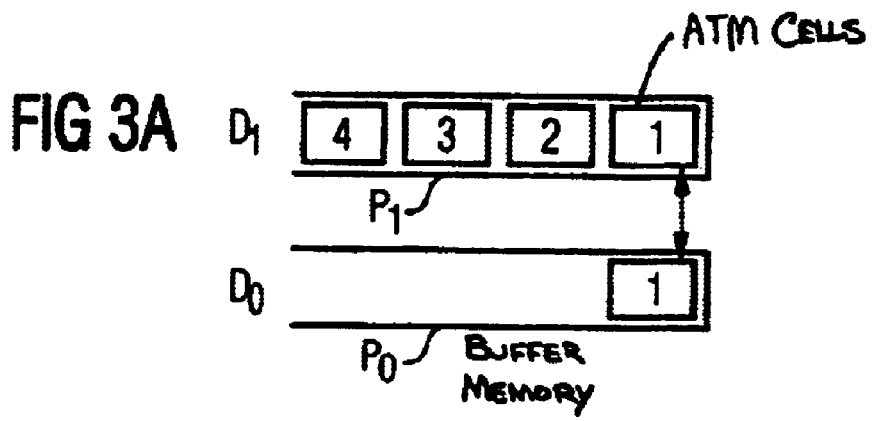
FIGS. 3A to 3B are schematic diagrams illustrating examples of the error correction.

FIG. 3a shows the conditions during undisturbed operation. The two ATM cells to be compared agree with one another here.

Figure 3B:
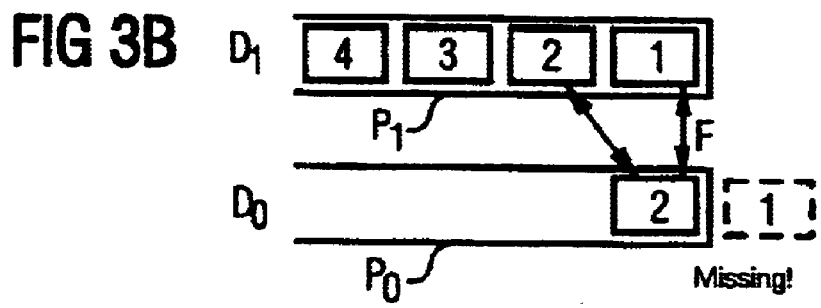

It is assumed in FIG. 3b that an ATM cell of the trailing data stream $D_0$ has been lost. In this case, the direct comparison of the two ATM cells leads to an inequality. Subsequently, a comparison with the older ATM cell of the leading data stream $D_1$ is then implemented. When the comparison of the current ATM cell of the trailing data stream $D_0$ to the second-oldest ATM cell of the leading data stream $D_1$ leads to an agreement, then it is assumed that an ATM cell was missing in the trailing data stream $D_0$. The corresponding ATM cell of the leading data stream $D_1$ is then removed from the buffer memory and the failure recognition phase is continued.

Figure 3C:
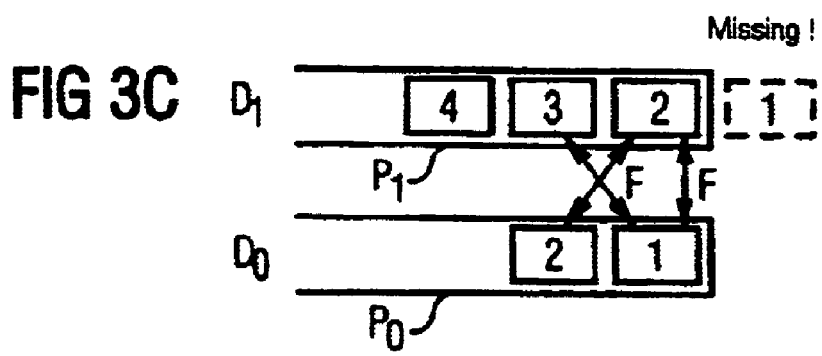

It is assumed in FIG. 3c that an ATM cell of the leading data stream $D_1$ has been lost. In this case, the direct comparison of the two first ATM cells as well as of the first to the following leads to an inequality. When the comparison of the current ATM cells of the following ATM cell of the trailing data stream $D_0$ to the oldest ATM cell of the leading data stream $D_1$ leads to no agreement, then it is assumed that an ATM cell had been missing in the leading data stream $D_1$. The corresponding ATM cell of the trailing data stream $D_0$ is then overlooked and the failure recognition phase is continued.

Figure 3D:
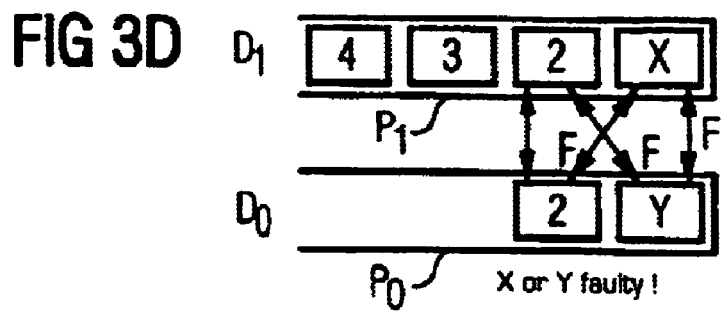

It is assumed in FIG. 3d that the two ATM cells of the leading data stream $D_1$ and of the trailing data stream $D_0$ have been lost. When the comparison of the pair of ATM cells following the current comparison pair leads to agreement, then it is assumed that one of the ATM cells of the current pair is faulty. Both comparison pairs (current, faulty pair and following, correct pair) are then removed from the buffer memory and the failure recognition phase is continued.

When ATM cells are no longer received at all from one of the two data streams, then the synchronization is no longer established and the search phase is started again. When the delay between the two data streams $D_0$, $D_1$ changes, so that the trailing data stream $D_0$ overtakes the leading data stream $D_1$, then the roles are interchanged. Such a change is recognized when two corresponding ATM cells are first simultaneously received and, subsequently, an ATM cell of the previously trailing data stream $D_0$ is received first.

The second stage of the inventive method is subsequently run which relates to the switchover process that was addressed above. A selection is made in this process as to which of the ATM cells of the data streams $D_0$, $D_1$ are to be supplied to further devices via connecting paths W. The switchover process is run independently of the selected synchronization method.

A first development of the invention selects the ATM cells of the leading data stream $D_1$. Regardless of the fact that they are stored for the synchronization, these cells are then immediately forwarded to the output when they arrive. When the delay between the two data streams changes, so that the trailing data stream $D_0$ overtakes the leading data stream $D_1$, then the selection is also switched to the other data stream together with the (aforementioned) change in roles in the synchronization.

When one data stream fails completely, then, following a potential changes in roles, the ATM cells are selected from the remaining data stream, which is then considered to be leading. An interruption-free switch is thus established given failure of a data stream. After eliminating the failure, the data stream that is again available is synchronized with the existing one. When it turns out that it is the leading data stream, then a switch must occur. This occurs in that the ATM cells of the leading, non-selected data stream are forwarded via the buffer memory to the output and the buffer memory is emptied by faster readout than entry. The rate of the ATM cells, however, is briefly changed by this. Given connections having high demands with respect to the continuity of the delay, the compensation procedure must be extended onto a long time span.

In this method, the delay that arises due to synchronization and selection is minimal, since no buffering of the ATM cells occurs and the data stream having the lower running time is always selected. However, faulty or missing ATM cells are also continued in the output data stream since their recognition is only possible later upon arrival of the data units of the trailing data stream.

In an alternative development of the invention, the ATM cells of the trailing data stream $D_0$ are selected. Upon arrival, the ATM cells of the trailing data stream are compared to those of the leading data stream during the course of the synchronization and are forwarded to the output in the error-free case. When the difference in delay between the two data streams changes, so that the trailing data stream overtakes the leading data stream, then the selection is also switched to the other data stream together with the change in roles in the synchronization.

When missing ATM cells in a data stream are detected in the synchronization tests during the failure recognition phase, then these cells are supplied to the output data stream from the other data stream in the selection. When a data stream completely fails, then one waits up to a defined maximum delay difference and readout is undertaken then from the still intact data stream backed up in the buffer.

After eliminating a failure, the data stream that is again available is synchronized with the existing one. When it turns out that it is the trailing data stream, then a switch must take place. This occurs in that the ATM cells of the leading, non-selected data stream are forwarded from the buffer memory to the output, and the buffer memory is filled by slower readout than entry. However, the rate of the ATM cells is briefly changed by this. Given connections having high demands with respect to the continuity of the delay, the compensation procedure must be extended onto a long time span.

The method offers the advantage that a compensation of losses in a data stream is possible. When, moreover, faulty data units are recognized by checksums, then errors in individual ATM cells can also be corrected. However, a delay that is equal to the maximum of the two delays of the data streams must be accepted in this method.

The above-described method is illustrative of the principles of the present invention. Numerous modifications and adaptions thereof will be readily apparent to those skilled in this art without departing from the spirit and scope of the present invention.

What is claimed is:

1. A method for synchronizing data streams having a data stream comprising a plurality of data units that correspond to ATM cells, comprising:

splitting said data stream into respectively two congruent, redundantly fashioned data sub-streams;

merging said two data sub-streams, one of said two data sub-streams being defined as leading;

writing each of said two data substreams into a respective buffer memory at a beginning of a search phase;

comparing, during said search phase, data units of said two data su streams to one another over a specific length that corresponds to a multiple of an ATM cell, thereby producing synchronism between said two data sub-streams;

comparing, during a confirmation phase, said data units of said two data sub-streams over said specific length, thereby checking the synchronism detected; and checking said synchronism to ensure that it is being maintained in a failure recognition phase.

2. The method according to claim 1, further comprising:

correcting an ATM cell recognized as faulty/missing during an error recognition procedure by replacing said faulty/missing ATM cell with a corresponding ATM cell taken from an intact other said redundant substream.

3. The method according to claim 1, further comprising supplying ATM cells optionally corrected based on criterion of said error recognition procedure to further devices.

* * * * *